Figure 1:
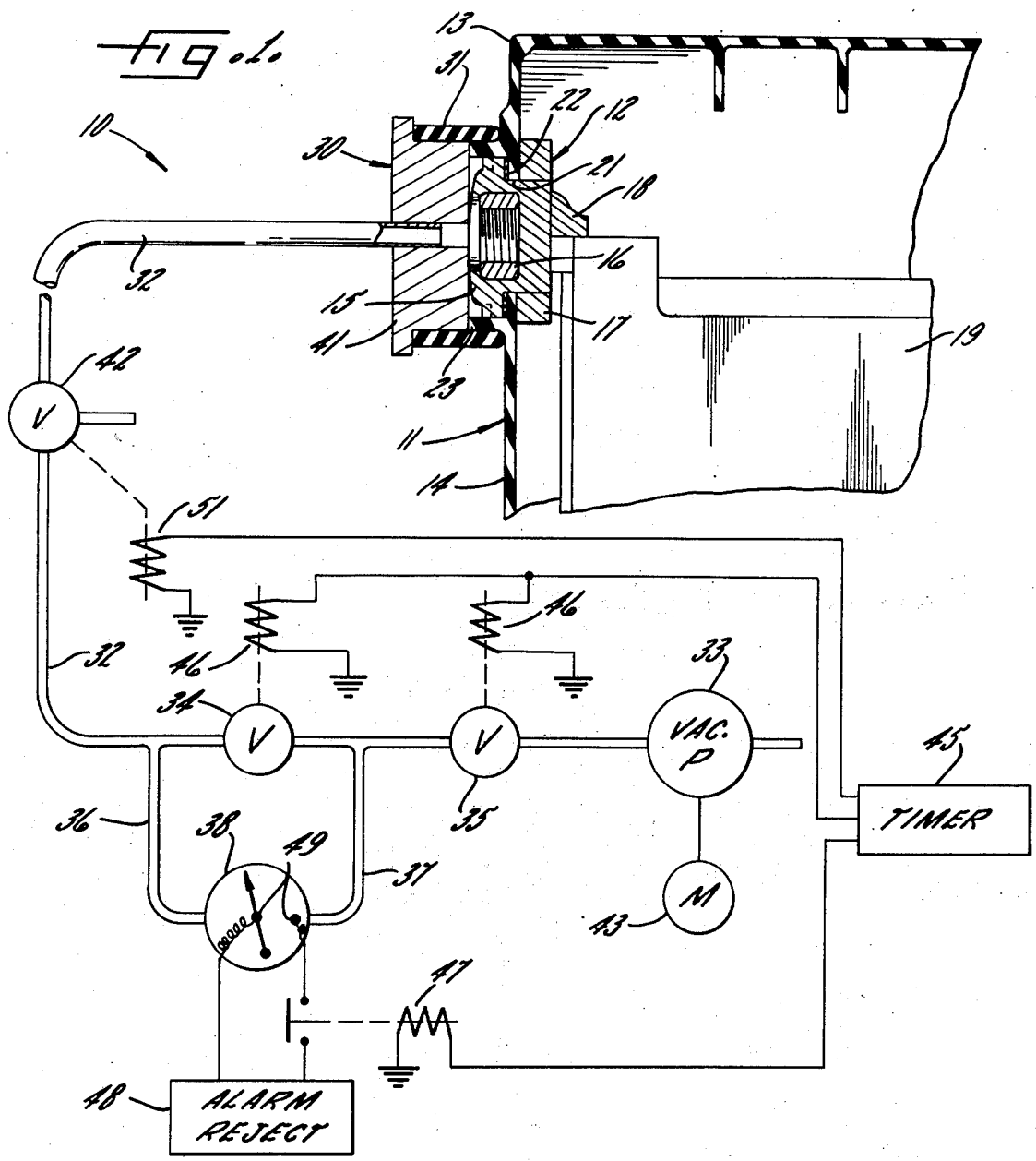

United States Patent [19]

Oswald

[11] 3,793,876
[45] Feb. 26, 1974

[54] BATTERY TERMINAL LEAK DETECTOR
[75] Inventor: Thomas L. Oswald, St. Paul, Minn.
[73] Assignee: Gould Inc., Mendota Heights, Mich.
[22] Filed: Aug. 10, 1972
[21] Appl. No.: 279,377

[52] U.S. Cl. .................... 73/46, 73/49.2, 136/182
[51] Int. Cl. ............................................ G01m 3/26
[58] Field of Search ...... 73/46, 49.7, 49.8, 40, 49.2; 340/242; 136/182, 135

[56] References Cited
UNITED STATES PATENTS
3,369,392  2/1968  Christensson ...................... 73/49.2
3,039,295  6/1962  Le Mat et al. ...................... 73/49.2

Primary Examiner—Jerry W. Myracle
Assistant Examiner—Joseph W. Roskos
Attorney, Agent, or Firm—Wolfe, Hubbard, Leydig, Voit & Osann, Ltd.

[57] ABSTRACT

A leak detector including a head with a resilient lip that is fitted closely around a battery container terminal assembly that is connected by a line to a source of vacuum. A pair of valves in the lines are opened to evacuate the head and pull the lip into sealing engagement with the periphery of the terminal assembly, and then both valves are closed and the pressure differential, if any, across the valve closest to the head is sensed. A leak is evidenced by development of a pressure differential across the first valve, and if the differential exceeds a predetermined value for a given time interval an alarm or reject circuit is actuated.

2 Claims, 2 Drawing Figures

BATTERY TERMINAL LEAK DETECTOR

This invention relates generally to apparatus for detecting small leaks in assembled containers and, more particularly, concerns checking storage battery terminals for possible leakage.

Automotive batteries with side wall terminals have become increasingly popular, with the terminals being at least partially below the normal level of liquid electrolyte in the battery so that potential electrolyte leakage problems are created. Electrolyte leakage from a battery cannot, of course, be tolerated and efforts have been directed toward designing side terminals suitable for high volume production without subsequent leakage problems.

A collateral problem is presented by the need to check battery production operations in order to reject defective, in this case leakable, side terminal assemblies such as might result from slight imperfections in the parts or some error in the assembly procedure. Heretofore, available leak detection apparatus has been expensive, slow in operation, and quite adversely sensitive to temperature fluctuations, vibration and other normal aspects of a battery production plant.

Accordingly, it is the primary aim of the invention to provide a battery terminal leak detector that is accurate, which operates rapidly, and which is well suited for battery production conditions in that it is durable and stable despite high temperatures and mechanical vibrations.

A further object of the invention is to provide a detector of the above character that is economical to make, use and service, primarily because the detector is made up of relatively easily obtainable, standard components.

Figure 2:
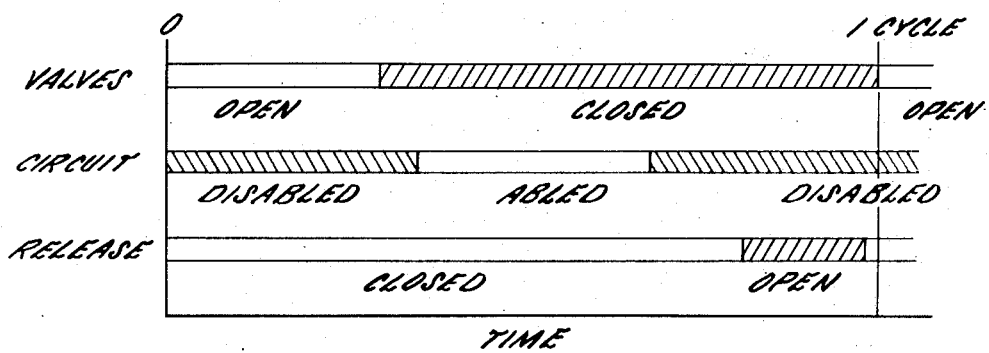

Other objects and advantages of the invention will become apparent upon reading the following detailed description and upon reference to the drawings, in which:

FIG. 1 is a partially diagrammatic and partial fragmentary section of a detector embodying the invention associated with a battery under test; and FIG. 2 is a chart reflecting the operating sequence of the detector of FIG. 1.

While the invention will be described in connection with a preferred embodiment, it will be understood that I do not intend to limit the invention to that embodiment. On the contrary, I intend to cover all alternatives, modifications and equivalents as may be included within the spirit and scope of the invention as defined by the appended claims.

Turning first to FIG. 1, there is diagrammatically shown a detector 10 embodying the invention and positioned in operational relationship with an electric storage battery 11 having a pair of side terminal assemblies of which only the assembly 12 is shown. The battery 11, of which only a sectional fragment appears, includes a cover 13 integrally sealed to a container 14 having a side wall through which the terminal assembly 12 passes. The terminal assembly is formed by a head portion 15, embedding a threaded connection member 16, on the outside of the container 14, and a ring 17 fused to the head portion 15 on the inside of the container. A lug 18 electrically connects the terminal assembly 12 to plate structure 19 in the cell.

The terminal assembly 12 thus passes through an opening 21 in the wall of the container 14 that is at least partially below normal liquid electrolyte level. A gasket 22 helps seal against leakage and a cylindrical ring 23 molded integrally with the container 14 surrounds the terminal assembly 12 and shields it against accidental glancing or shearing blows.

Pursuant to the invention, the liquid sealing integrity of the terminal assembly 12 which prevents electrolyte leakage through the opening 21 is tested by sensing for possible air leakage through the assembly. It has been found that a leak allowing more than one cubic centimeter per minute of air to flow at a pressure differential of 15 psi — approximate atmospheric pressure — represents a liquid electrolyte seepage threshold so that terminal assemblies having a higher air leakage rate should be rejected.

In accordance with the invention, the detector 10 includes a head 30 having an extending flexible resilient lip 31 sized to surround the terminal assembly 12 and which is connected by a line 32 to a source of vacuum such as a vacuum pump 33, the line 32 having valves 34 and 35 positioned in the line so as to selectively couple the head 30, the pump 33 and the opposite sides 36 and 37 of a pressure differential sensor 38. In more detail, the head is defined by a cylindrical block 41, and the lip 31 is annular and sealed to the periphery of the block. The line 32 is sealed within a passage extending through the block 41. A three-way valve 42 is interposed in the line 32 and is normally set so that the line 32 is open between the head 30 and the valve 34. A motor 43 is connected to drive the pump 33.

When both of the valves 34, 35 are opened with the head 30 positioned so that the lip 31 surrounds the ring 23, the line 32 is evacuated and atmospheric pressure tightly clamps the lip 31 in sealing relation around the terminal assembly 12. When the valves are thereafter closed, a vacuum is maintained in the line 32 between the valves 34 and 35 which is connected to the side 37 of the sensor 38, and a vacuum is established in the line 32 between the head 30 and the valve 34 which is connected to the other side 36 of the sensor 38. There is thus established an atmospheric pressure drop, i.e., about 15 psi, across the terminal assembly 12 from the inside to the outside of the container 11.

Preferably, the inner end of the lip 31 is coated with a silicone based vacuum grease to insure a good seal.

If there is air leakage through the terminal assembly 12, the sensor 38 will begin to detect a pressure differential across the valve 34 as the vacuum is no longer maintained at the side 36 of the sensor and, if the leakage rate exceeds the predetermined minimum such as the 1 cc/min. referred to above, it is known that a defective assembly has been found.

For operating and controlling the detector 10, the detector includes a timer 45 that selectively energizes a pair of solenoids 46, which operate the valves 34, 35, as well as a third solenoid 47, which ables and disables an alarm-reject circuit 48 that is also controlled by the sensor 38. For each operating cycle, as charted in FIG. 2, the timer 45 first operates the solenoids 46 so as to open the valves 34, 35 for a short period sufficient to evacuate the line 32, and the valves 34, 35 are thereafter closed until the start of the next cycle. Shortly after closing the valves 34, 35, the timer picks up the solenoid 47 to able the circuit 48 for a period that, considering the size of the line 32 and the sensitivity setting of the sensor 38, would cause the sensor to close contacts 49 and energize the circuit 48 if the air leakage rate through the terminal assembly 12 exceeded the desired threshold value. Of course, if the leakage is nonexistent or negligible, the timer 45 will again disable the circuit 48 without the sensor 38 having closed its contacts 49 and the terminal assembly under evaluation will have passed the leakage test.

Toward the very end of the operating cycle, the timer 45 briefly operates the three-way valve 42 through a solenoid 51 so as to open the line 32 between the valve 42 and the head 30 to the atmosphere. This equalizes the pressure within and without the head 30 and thus facilitates removal of the head from the assembly 12. By utilizing a three-way valve for the release valve 42, the line 32 between the valve 42 and the pump 33, together with the associated parts of the apparatus, are not opened to the atmosphere when the head 30 is released, and hence less work is required to evacuate the system during the next cycle. The head is then positioned about the next assembly to be checked and the cycle is repeated.

Typical time values for an operating detector include a 6 second interval for having the valves 34, 35 open so as to establish the vacuum, a one second delay between closing the valves and abling the circuit 48 and a 5 second interval during which the circuit 48 is abled and the sensor is measuring. In the typical operating detector, the contacts 49 close if there is a pressure rise at the side 36 to about 0.0043 psi, which is roughly equivalent to a leak of 1.0 cc/min.

The leak detector 10 is quite accurate and is able to function rapidly and reliably under typical battery manufacturing conditions. The elements making up the detector are quite durable and stable under temperature and vibration extremes. Those familiar with the art will appreciate that the detector is made up of relatively easily obtainable, standard components so that it is economical to make, use and service.

I claim as my invention:

1. A detector for sensing leaks in a through-the-wall battery terminal comprising, in combination, a head having an extending flexible resilient lip sized to surround said terminal, a line coupled to said head connecting the interior of said lip to a source of vacuum, a pair of valves connected in said line for selectively closing the line to air flow at two spaced points, a pressure differential sensor connected to said line on either side of the valve of said pair that is closest to said head so as to measure the air pressure differential across that valve, means for opening said valves while said lip surrounds said terminal so that atmospheric pressure flexes said lip and tightly clamps the lip in sealing relation around the terminal and for thereafter closing said valves to maintain a vacuum in said line between said valves and to establish a vacuum in the line between said head and the closest valve, and means for generating a control signal if said sensor detects a pressure differential increase of more than a predetermined amount during a given time interval.

2. The combination of claim 1 in which said terminal is shielded in a cylindrical ring integral with the battery wall, said lip being annular and sized to slip closely over said ring so that, when said valves are opened, a substantial, airtight, cylindrical sealing area is established between the lip and the ring.

* * * * *